Apr. 17, 1923.

H. C. WILLIAMS 1,452,101

MOTION PICTURE APPARATUS

Filed May 23, 1921

Inventor
Harry C. Williams
By Lancaster Allwine
Attorneys

Apr. 17, 1923.
H. C. WILLIAMS
1,452,101
MOTION PICTURE APPARATUS
Filed May 23, 1921
2 Sheets-Sheet 2
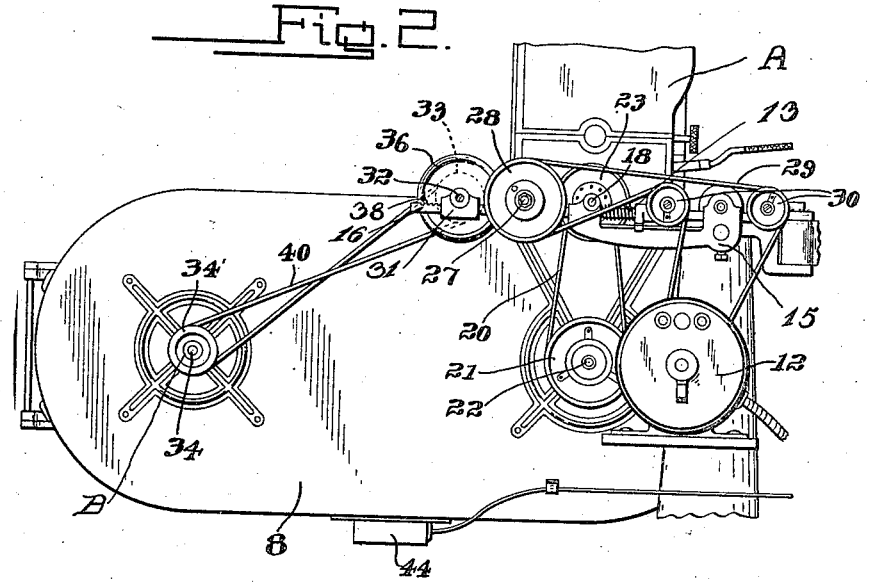
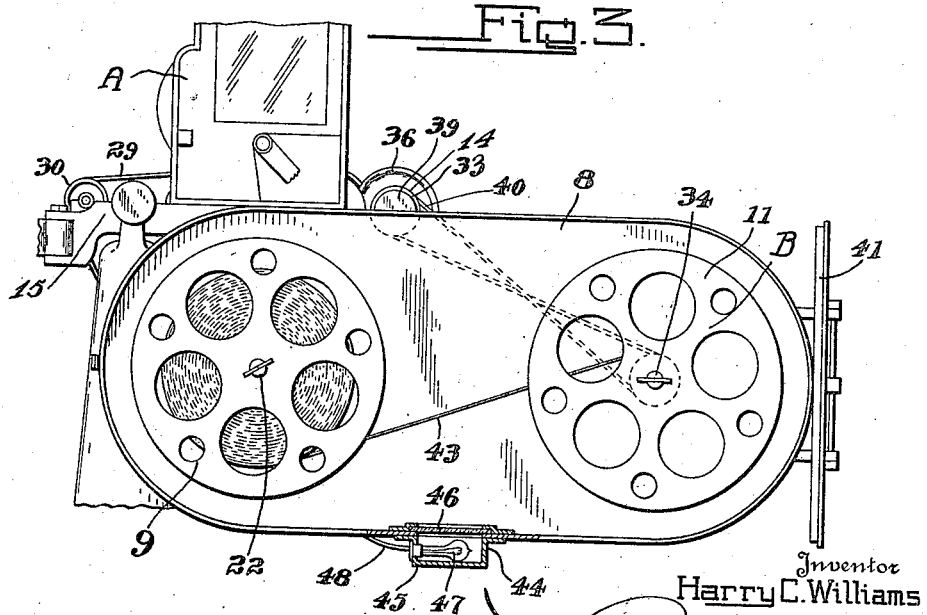
Inventor
Harry C. Williams
By Lancaster & Allwine
Attorney Patented Apr. 17, 1923.

1,452,101

UNITED STATES PATENT OFFICE.

HARRY C. WILLIAMS, OF FULTON, KENTUCKY.

MOTION-PICTURE APPARATUS.

Application filed May 23, 1921. Serial No. 471,697.

*To all whom it may concern:*

Be it known that I, HARRY C. WILLIAMS, a citizen of the United States, residing at Fulton, in the county of Fulton and State of Kentucky, have invented certain new and useful Improvements in Motion-Picture Apparatus, of which the following is a specification.

This invention relates to motion picture machines, and more particularly to film reeling mechanism, and the primary object of the invention is to provide an improved means for rewinding film without necessitating the removal of the take-up reel from the lower magazine, and the employment of the usual auxiliary rewinding mechanism, such as the rewinding bench and the like.

Another object of the invention is the provision of an improved rewinding mechanism embodying a novel means for associating the rewinding reel with the machine, and a novel means for connecting the rewinding reel with the driving mechanism, said means being so constructed and arranged as to throw the drive for the machine out of gear, and at the same time throw the rewinding mechanism in gear or vice versa.

A still further object of the invention is to provide an improved rewinding mechanism which can be incorporated with ordinary types of motion picture machines at a minimum amount of time and expense and which is of exceptionally simple and durable construction. With these and other objects in view, the invention consists in the novel construction, arrangement and formation of parts, as will be hereinafter more fully described, claimed and illustrated in the accompanying drawings, forming a part of this specification in which drawings:

Figure 2 is an enlarged fragmentary elevation of a motion picture machine looking in a direction opposite to that in Figure 1, showing the improved rewinding mechanism incorporated therewith.

Figure 3 is an enlarged fragmentary side elevation of a motion picture machine equipped with the improved rewinding mechanism, the door of the lower magazine being shown open to illustrate the position of the take up and rewind reels therein, parts of the magazine being shown in section.

Referring to the drawings in detail, wherein similar reference characters designate corresponding parts throughout the several views, the letter A indicates the motion picture machine; and B, the improved rewind mechanism therefor.

Figure 1:
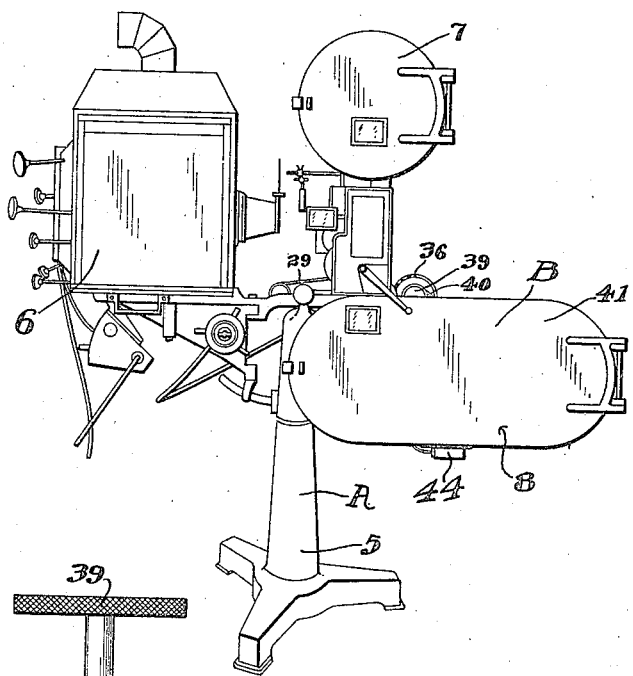
Figure 1 is a side elevation of a motion picture machine with the improved rewinding mechanism incorporated therewith.
Figure 4:
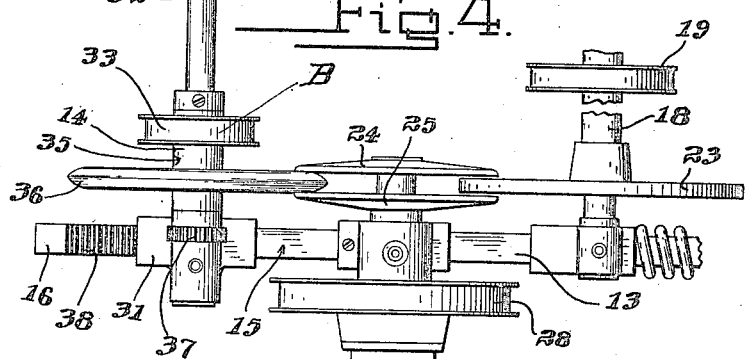
Figure 4 is an enlarged fragmentary detail plan view of a portion of the drive mechanism for the take up reel and the rewind reel.

The motion picture machine A may be of any preferred type or make, and as shown the improved rewinding mechanism has been shown in connection with a Simplex machine, but it is to be understood that the same can be incorporated with any other type of motion picture machine that may be desired. The machine A includes the pedestal or base 5, the lamp house 6, the upper magazine 7 for the feed reel, and the lower magazine 8, which is of special construction, for the take up reel 9 and the rewind reel 11. The machine A may be provided with the usual operating motor 12 for operating the feed up reel and the take up reel 9 and the other parts of the machine, and it is also contemplated to drive the rewind mechanism from this motor. The driving mechanism for operating the take up reel 9 is indicated by the numeral 13 and is of the usual construction and has attached thereto the improved means 14 for permitting the rewinding reel 11 to be driven thereby. These parts are so arranged and cooperate with each other in such a manner that when the take up reel is thrown out of operation, the rewind reel will be thrown into operation or vice versa. The driving mechanism 13 is mounted upon a frame 15 which includes a longitudinally extending movable bar 16, which supports a transversely extending shaft 18 which has secured thereto in any preferred manner the usual drive pulley 19, which has trained around the same the drive belt 20, which is in turn trained around the driven pulley 21, connected in the usual manner to the shaft 22 of the take up reel 9.

Arranged on the shaft 18 is a single friction disc or wheel 23, the opposite sides of which are adapted to be engaged by the friction discs 24 and 25, which are normally urged toward each other by means of the spring 26. These discs 24 and 25 are slidably mounted upon the shaft 27, which has secured thereto in any preferred manner the belt pulley 28, around which is trained the drive belt 29. This drive belt 29 is also trained around guide pulley wheels 30 and around the drive pulley carried by the armature shaft of the operating motor 12. Slidably mounted upon the longitudinally extending rod 16 is the frame 31, which rotatably supports the transversely extending shaft 32. This shaft 32 has rotatably mounted thereupon the drive pulley 33, which is utilized for operating the shaft 34 of the rewind reel 11. The pulley 33 is carried by the sleeve 35 and this sleeve 35 also has keyed thereto the starting and stopping disc 36. The periphery of the disc 36 is bevelled on its forcing sides so as to form a wedge for forcing the friction discs 24 and 25 away from each other, and out of engagement with the single drive disc 23. The shaft 32 has keyed thereto a pinion 37, which is adapted to mesh with a rack face 38 formed on the upper surface of the bar 16. The shaft 32 is also provided with an operating handle 39, and it can be seen that by turning the operating handle 39, the starting and stopping disc 36 may be brought into and out of engagement with the operating discs 24 and 25. When the starting and stopping disc 36 is brought intermediate the operatings discs 24 and 25 the same will be forced away from the single friction disc 23, and thus the shaft 18 will not be rotated, and consequently the take up reel will be out of gear. Owing to the frictional engagement of the starting and stopping disc with the operating discs 24 and 25, however, the pulley 35 will be rotated, and this pulley will transmit its movement by means of the belt 40 and the rewind reel pulley 34' and shaft 34 to the rewind reel 11. The shafts 22 and 34 for the take up reel 9 and the rewind reel 11 are rotatably mounted in any preferred manner in the lower magazine 8 and the reels can be held thereon in the usual or any preferred manner.

The magazine 8 is held in position on the machine A in any preferred manner, and is formed of sufficient length to readily accommodate the take up reel 9 and the rewind reel 11. A door 41 is provided for the magazine 8 so that access to the reels may be readily had.

When it is desired to rewind a film from off of the take up reel 9, it is merely necessary to place a reel upon the shaft 34 and operate the handle 39, so as to move the starting and stopping disc 36 intermediate the operating discs 24 and 25. As heretobefore stated, this will spread the discs and stop the drive of the single disc 23 of the take up reel, and the starting and stopping disc will be rotated by the operating discs and thus rotate the pulley 35 and consequently the shaft 34. It is to be understood that prior to the feeding of the starting and stopping of the disc into the operating disc, the film designated by the numeral 43 in Figure 3 of the drawings may be secured to the hub of the rewind reel in the ordinary manner.

In order to facilitate the examining of the film 43 during the rewinding thereof to see if there are any flaws therein, an attachment 44 is provided for the lower magazine 8. This attachment includes a supplemental casing 45, which is carried by the lower wall of the magazine 8. The upper surface of the supplemental casing 45 is provided with a transparent upper wall 46, through which the rays of light from an incandescent lamp 47 are adapted to shine. The lamp 47 may be arranged in the supplemental casing in any preferred manner and the feed wires 48 thereof may lead to the rheostat or to the line wires, if so desired. It can be seen however, that the light shining up through the glass 46 will shine through the film and thus render the examining thereof easy.

Changes in details may be made without departing from the spirit or scope of this invention; but,

I claim:

1. The combination with a motion picture machine including a feed reel, a take up reel, an operating shaft, a drive mechanism for operatively connecting the operating shaft with the take up reel, of a rewind reel arranged adjacent to the take up reel, and a single means for disconnecting the take up reel from the operating mechanism therefor and for operatively connecting the rewind reel with the operating mechanism.

2. In a motion picture machine, the combination with a magazine, a take up reel arranged in the magazine, a rewind reel arranged in the magazine, an operating shaft, a drive shaft for the take up reel, means for operatively connecting the drive shaft with the take up reel, a friction wheel carried by the drive shaft, a pair of sliding friction wheels adapted to engage the opposite sides of the first mentioned friction wheel, a shaft for carrying the last mentioned friction wheels, means operatively connecting the last mentioned shaft with the operating shaft, a rotatable and slidable shaft, a starting and stopping disc rotatably mounted upon said shaft and adapted to be forced between the pair of friction discs, and a drive pulley wheel for the rewind reel operatively connected to said starting and stopping disc.

3. In a motion picture machine, the combination with a take up reel, an operating motor, a drive shaft therefor, means operatively connecting the drive shaft with the take up reel, a friction wheel keyed to said drive shaft, a driven shaft, means operatively connecting the driven shaft with the operating motor, a pair of sliding friction discs keyed to and slidably mounted upon said driven shaft for engaging the opposite sides of the friction wheel, and a starting and stopping disc adapted to be forced between said friction discs for moving the same away from the friction wheel and adapted to be rotated by said pair of friction wheels, of a rewind reel arranged adjacent to the take up reel, and means operated by the starting and stopping disc operatively connected to the rewind reel.

4. In a motion picture machine, the combination with a take up reel, a drive shaft therefor, means operatively connecting the drive shaft with the take up reel, an operating shaft, a driven shaft, means operatively connecting the drive and driven shafts together, a friction wheel keyed to the drive shaft, a pair of slidable friction discs keyed to the driven shaft adapted to engage the opposite sides of the first mentioned friction wheel, a shaft slidable toward and away from the pair of friction wheels, a sleeve rotatably mounted upon said shaft, a starting and stopping disc secured to said shaft arranged for movement between the pair of friction discs for forcing the same out of engagement with the first mentioned disc, and a drive pulley secured to said sleeve, of a rewind reel arranged adjacent to the take up reel, and means operatively connecting said rewind reel with said drive pulley.

5. In a motion picture apparatus, a frame including a longitudinally extending bar, a take up reel, an operating shaft, a driven shaft carried by the bar, means operatively connecting the operating and driven shafts together, a pair of sliding friction wheels secured to said driven shaft, a drive shaft for the take up reel, a friction disc keyed to said last mentioned shaft arranged intermediate the pair of friction wheels, a casing slidably mounted upon said bar, means for moving said casing along said bar, a shaft rotatably mounted in the casing, a starting and stopping disc rotatably mounted upon the shaft, a pulley operatively connected to the starting and stopping disc, a rewind reel arranged adjacent to the take up reel, and means operatively connecting the pulley with the rewind reel.

6. In a rewind mechanism for motion picture machines, a drive shaft, a driven shaft for the operating mechanism of the motion picture machine, a friction disc keyed to said driven shaft, a pair of sliding friction discs keyed to the drive shaft and adapted to engage the opposite sides of the first mentioned friction disc, a rotatable starting and stopping device adapted to be forced between said friction discs for moving the same against the first mentioned friction disc and adapted to be rotated by said friction discs, a guide pulley for the rewind mechanism operatively connected to said starting and stopping disc.

HARRY C. WILLIAMS.